Aug. 13, 1968   R. A. PAUL ET AL   3,397,070

PROCESS FOR MAKING DEAD BURNED DOLOMITE

Filed April 12, 1966   2 Sheets-Sheet 1

United States Patent Office 3,397,070
Patented Aug. 13, 1968

3,397,070
PROCESS FOR MAKING DEAD BURNED
DOLOMITE
Robert A. Paul and Otto L. Forchheimer, York, Pa., assignors to The J. E. Baker Company, York, Pa., a corporation of Pennsylvania
Filed Apr. 12, 1966, Ser. No. 542,142
8 Claims. (Cl. 106—58)

ABSTRACT OF THE DISCLOSURE

A single step process for making dead burned dolomite brick grain by burning dolomite grain, sized related to that desired in the product grain, at a temperature of at least 3300° F. in a rotary kiln. A heat source in said kiln comprising a secondary fuel-air flame impinged upon a primary fuel-air flame to increase the flame temperature in substantially only the quadrant adjacent to the load. A dead burned dolomite grain with at least 98% MgO.CaO and having a hydration susceptibility of less than 5%.

---

This invention is directed to a process for making refractory material and more particularly is directed to a process, and to the resultant product, for making dead burned dolomite having high density, high purity, low porosity and high resistance to hydration. Such a product is highly desirable for use in making refractories. While the present invention will be described with regard to dolomite, it is to be understood that it applies as well to mixtures of dolomite and magnesium oxide or calcium oxide in all ratios and includes, as well, mixtures which may contain impurities in small amounts.

A relatively high purity, dead burned dolomite grain has been produced for many years in shaft kilns. Due to the nature of this type of kiln and the necessity for unobstructed flow of combustion gases therein, relatively large particles or stones must be burned. This leads to the production of a clinker rather than a grain, a clinker having to be crushed to form the final granular refractory. Also, due to the nature of the kiln, the ash resulting from the fuel is mixed with the product, and, in the case of the more economical solid fuels, may contribute considerable quantities of impurities.

When a clinker has to be crushed to produce a brick grain, the hydration resistance of the grains is much less than that of the clinker and is also less than if the grain had been itself burned rather than produced from a larger particle by crushing. This is believed due to the fact that in burning at high temperatures, a "skin" is developed on the outside of the particle being burned and subsequently cooled. The nature of the skin is not fully understood, but it is presumed to have some connection with the shrinkage of the surface of the particle when it first hits the colder environment while the inside of the particle is still hot. This skin is more resistant to hydration than a fresh surface formed by the comminution of a particle at the completion of the firing and cooling process. From such an operation, it is difficult to produce a uniform density.

In the prior art the resistance to hydration was largely imparted by the addition of one of several known fluxes which covered the particles of dolomite with layers of materials less susceptible to hydration. The demand in recent years for a dead burned dolomite refractory of high purity has made the addition of fluxes to the material less desirable. In order to render pure, dead burned dolomite less resistant to hydration an unusually high temperature of burning is required, which was not considered to be obtainable in a rotary kiln on a commercial basis. If obtainable in a rotary kiln it could be obtained only at a high cost due to the low thermal efficiency of a rotary kiln at high temperatures. Thus, the prior art considered the rotary kiln process for this product not to have utility, and it was not used.

Therefore, a method used to prepare such dead burned dolomite was to burn it in rotary kilns at lower temperatures, similar to those for fluxing materials, which resulted in a product which was very susceptible to hydration and difficult to store. Such low temperature products have poor density and are often not burned thoroughly but may have "soft centers." The flux addition reacts exothermally with the dead burned dolomite increasing the local temperature of the grain by about 100° C. and helping to dead burn the granular material. The extra amount of heat is not available when burning pure dolomite.

Another method known in the art for burning pure dead burned dolomite consists of a much more expensive two-burning-step process in which the raw stone is first burned to a lime stage, then ground and compacted to briquettes or similar agglomerates, and finally reburned in shaft kilns at temperatures up to about 4000° F. The briquettes must be crushed to obtain a grain sized product.

It is known in other arts utilizing the rotary kiln to use oxygen in place of air to obtain a significant production improvement. Attempts in the cement industry to utilize oxygen as a direct substitute for air in supporting the combustion of the primary fuel were largely unsuccessful because of overheating of the kiln. Also, it was known in the cement art, that production improvement may be obtained by injecting oxygen into the load quadrant of the flame in the kiln. By injecting the oxygen into the load quadrant, the refractory is shielded from the hottest part of the flame by the load in that quadrant and by the mirror effect and insulation shield effect of the main body of the flame in the other three quadrants. The temperature in the burning zone of a cement kiln varies between about 2500 to 3000° F. which is considerably lower than that of kilns used for dead burning dolomite in accordance with the present invention. The problems encountered at the lower temperatures are different in kind from those encountered at the higher temperatures required in the practice of the present invention. Attempts made to apply the teaching of the cement burning art to the dead burned dolomite art were unsuccessful, and it became necessary to develop particular processes and techniques for the peculiar problems of the dead burned dolomite art.

It is an object of this invention to provide a process for making dense, low porosity, high purity, hydration resistant, dolomite refractory grain by a more economical process.

It is a further object of this invention to provide a process for making a high quality, dead burned dolomite in a rotary kiln.

It is another object of this invention to provide a process for making high quality, dead burned dolomite in a single burning step.

Other features and objects will be apparent to those skilled in the art from reading the following description taken in conjunction with the drawings in which.

Figure 1:
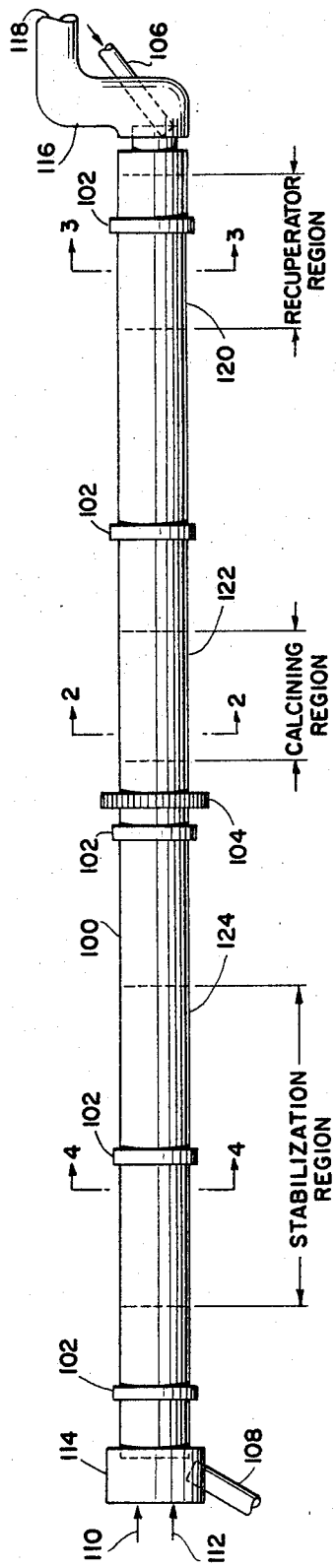
FIGURE 1 is an elevational view of a rotary kiln which may be used in the practice of the present invention.

The objects of the present invention may be achieved by burning dolomite in a single step in a rotary kiln utilizing improved combustion apparatus and techniques in order to achieve dolomite temperature levels of at least 3300° F. for a suitable period of time depending on purity level. The present invention permits the burning, on a commercial basis, of dead burned dolomite in a rotary kiln but at an increased temperature and in a manner to produce a denser product which is equal to or more resistant to hydration than the products of any of the earlier known methods.

In order to raise the dolomite load temperature to the temperatures found necessary in the practice of the present invention, that is 3300 degrees and up, attempts were first made to substitute oxygen for a portion of the air required for the combustion of the coal. But, there was no significant effect on the temperature of the flame. Next, an oxygen lance was used much in the manner that is known in the cement burning art. That is, a pipe or lance of pure oxygen was impinged on a peripheral portion of the flame. Unsatisfactory results were obtained.

It was found, however, that by providing a portion of the total heat requirement through a second burner and utilizing oxygen to support the combustion of the fuel in connection with that burner, that under certain apparatus arrangements the required high temperatures of the present process could be achieved. It was found that best results were obtained when the impingement occurred after the combustion of the fuel-oxygen flame was substantially complete. It was found necessary that the flame of the secondary burner impinge on the flame from the main burner to produce there a region of higher temperature flame. Ideally, this region is in the flame quadrant nearest to the load. Thus the advantages of higher flame temperatures radiating to the load are obtained, along with the advantages of insulation of the refractory from the high temperature by the load in one part and by the relatively low temperature flame in the remaining parts.

The present invention accomplishes the production of a dead burned dolomite grain in one burning. The final dead burned granular product is formed in the kiln so that no subsequent crushing is required. Raw dolomite is crushed and sized, before burning, so that the burned and shrunken product will, after burning, have the desired particle size range. A raw dolomite having less than 1% impurities is desirably used as the feed in order to obtain especially advantageous results. The product desired in the present invention is a highly pure dead burned dolomite. The product of the present invention is far more refractory than the fettling grade dolomite as no fluxes are added to it. Fettling grade dolomite is a dead burned product to which certain fluxes have been added to enable it to be burned at a lower temperature and to have enhanced hydration resistance given by the fluxes. By means of the present process, a hydration resistance is achieved for the pure product greater than that for the fluxed product by means of high burning temperatures and appropriately long residence periods in the kiln.

The present process results in a product of dead burned dolomite grain which is normally 98% by weight MgO.CaO The product is composed of hard, crushed dolomite particles, rather than being made from compacted fines, and has a desirable high density and desirable low pore volume, which makes it especially suitable for use in refractory brick.

The product obtained by the present process can be as pure as the raw material used; therefore the process is capable of producing a highly pure, dead burned dolomite grain. The purity of the grain product is such that the total flux impurity is less than 2.0% by weight.

The hydration resistance of this material, which need not be crushed after burning, is high. The hydration resistance is, in fact, higher than that of fettling grain and equal to or higher than that of pure grain produced by any other process. A measure of hydration resistance is the standard ASTM Method No. C492–62T for hydration susceptibility (the converse of hydration resistance). The present process consistently produces dead burned dolomite grain with an average hydration susceptibility less than 5.0% and has produced grain with hydration susceptibility as low as 0.4%. This is an exceptionally good result at high purity levels and compares with the usual result of 12% or more, using other processes.

The product further has a uniformly high density. Material produced according to this invention will have a bulk density greater than 3.20 and a specific gravity about 3.40 or greater. The density is greater and more consistent than that produced from shaft kiln clinker and equal to or greater than that produced by the cumbersome and expensive two-step burning process.

The closed pore volume of the product is between about 1 to 2% as determined by the use of a Beckman Air Pycnometer. This compares favorably with the closed pore volume products made by other processes, for instance the two-step process.

The outer surfaces of the particles are fire polished and uniform in their properties. This distinguishes them from dolomite products which have a non-uniform, non-fire polished surface because the products are crushed after burning.

The maximum temperature which the dolomite reaches during the burning process is controlled to between about 3300° F. and 4200° F., preferably 3660° F. Advantageous results have been obtained with temperatures between 3500 and 3660° F. Attempts to make the present product with the dolomite reaching a maximum temperature of 3200° F., or less, were not successful.

The required burning temperature of the dead burned dolomite grain depends upon the purity of the raw dolomite, and therefore will vary as the raw dolomite varies in flux content. The temperature required for the process may be described as that temperature at which sufficient energy is imparted to the particles to permit shrinkage of the particles to a high density particle. Because the required energy varies with the amount of impurities (flux) in the grain, the temperature required varies with the amount of impurities.

The required burning temperature of the dead burned dolomite grain also depends upon the size of the grain for a given time of burning. The grain that is useful in the practice of the present invention has a particle size that ranges between one inch to 200 mesh and finer, with a preferred range of ⅜ inch to 20 mesh (U.S. Standard Sieve Series). Particles between one inch and 8 mesh are especially advantageous for some applications. The size of the product is governed by the size of the feed. Due to shrinkage the product is about 15 to 25 percent smaller in each dimension.

The dolomite grain is exposed to the foregoing temperature for a period of at least two hours, under ideal conditions, and up to four hours. For a particle size in a preferred range, the best results are obtained when the dolomite is maintained at the temperature of 3660 degrees for about two to four hours. The retention time is short compared with the shaft kiln process in which the retention time may be twelve to sixteen hours or more.

To achieve the heat treatment required by the process, heat exchangers may be used in the rotary kiln. Further, the hot zone of the kiln may be lined with a high temperature basic refractory in combination with insulation in the fire zone.

A rotary kiln by its rotation tends to forge or peen the grains and such forgoing or peening is believed to help in producing a higher density of product than is obtained in a stationary furnace, such as a shaft kiln, where the tumbling action does not occur.

The present process may be practiced using any method of obtaining the temperature required for the process. The required temperatures may be achieved in a number of ways. For instance, the temperatures may be achieved by using larger quantities of fuel. However, it has been found desirable from the standpoint of fuel economy to utilize burners which are capable of reaching the higher temperatures without undue increase in fuel consumption.

The required high temperature may be accomplished in various types of apparatus. The major part of the heat input is preferably provided by pulverized coal burning as a long luminous flame, because its luminous particles radiate heat to the dolomite making up the kiln load and present economy in operation. A second, higher temperature flame is impinged on a portion of the coal flame. The second flame may be provided by a fuel gas-air burner or a fuel gas-oxygen burner, but preferably is provided by a fuel gas-oxygen burner.

The secondary flame preferably raises the temperature of a portion of the coal flame. By appropriate positioning of the secondary burner it is also possible to increase the temperature of a major portion, or all, of the flame but this is less desirable. It is preferred that the secondary burner be positioned with regard to the main burner and the load so that the hotter portion of the flame is on the side of the flame adjacent the load as may be seen in FIGURE 4.

When a combination of fuel gas and coal flames was used in carrying out the invention, it was found that the proper heat treatment to produce a high purity dead burned dolomite required a rate of production about half that required when ordinary fettling grade dolomite was produced in a similar kiln. When a fuel gas-oxygen flame was superimposed on the coal flame, sufficient temperature increase resulted so that the output of the process was three-quarters in quantity to that obtained in the production of fettling grain. Further, it is advantageous to use high heat recuperation and quick quenching.

One apparatus for achieving such a temperature gradient flame makes use of the angular relationship of a gas-oxygen flame and a coal-air flame. High temperatures may be generated and released in association with a coal-air burner by use of a small separate fuel gas-oxygen burner. Such combustion apparatus lends itself well to a rotary kiln and is a preferred apparatus for obtaining high temperatures using predominantly powdered coal. The two burners may be used to secure a 500° F. elevation over that which results from the combustion of the other fuels usually used in firing a rotary kiln, such as coal, fuel oil, and natural or manufactured gas. The temperature difference between the hotter and colder portion of the main flame may be at least 400° F. The larger portion, for instance about seven-eighths of the total heat requirement, may be obtained from fuel burned with air in a main burner. The additional heat requirement may be obtained from fuel gas which is burned in an auxiliary burner with excess oxygen, supplied by air or oxygen, the excess being one-quarter and three-quarters of the stoichiometric amount of oxygen required for complete combustion of the fuel gas. For convenience, in the following description an auxiliary, or impinging, burner will be described as a fuel gas-oxygen burner. However, it is to be understood that a fuel gas-air burner may be used as well.

The flame so produced has an effective temperature that approaches 4000° F. depending on the temperature and mixing of the secondary air. When an oxygen-gas flame is impinged at an angle to, and preferably on the load side of the center of a coal-air flame, the resultant flame burns at a maximum temperature of about 3690° F. with localized zones at higher temperatures approaching 4000° F. compared with the usual 3200° F.

Figure 2:
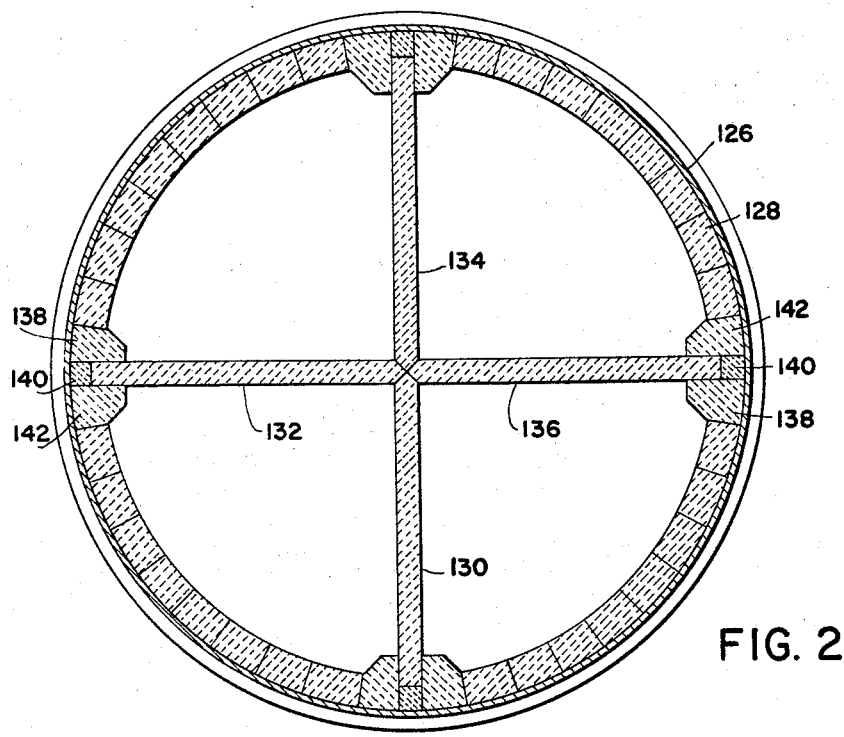
FIGURE 2 is a cross-sectional view taken generally along lines 2—2 of FIGURE 1 and showing a heat exchanger useful in the practice of the present invention.
Figure 3:
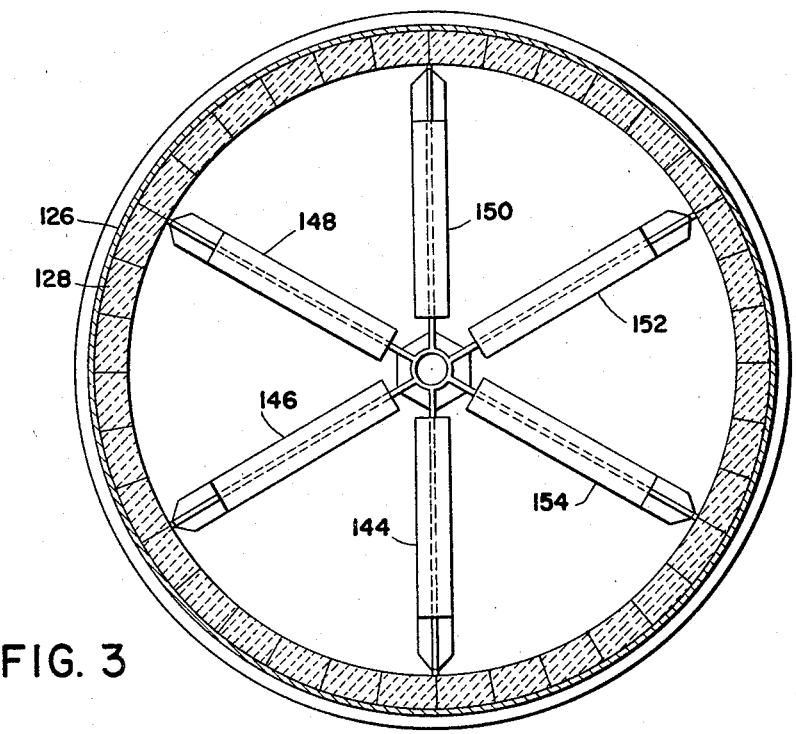
FIGURE 3 is a cross-sectional view taken generally along lines 3—3 of FIGURE 1 and showing another embodiment of a heat exchanger useful in the practice of the present invention.

A rotary kiln suitable for practice of the present process is shown in FIGURES 1, 2 and 3. The kiln 100 is supported on tires 102 rotating on suitable trunnions (not shown) and driven by a main gear 104 operated by a suitable motor and gear drive (not shown). The raw dolomite may be introduced into the kiln through a feed chute 106, and discharged by gravity through a discharge chute 108. The heat requirement may be supplied by coal burner 110 and fuel-gas burner 112 mounted in a hood 114, which may be movable in well-known fashion. The combustion gases may discharge through a stack 116 which may be provided with a dust chamber 118 and other devices and apparatus in well-known fashion.

As is shown in FIGURE 1 the dolomite in traveling through the kiln passes through a recuperator region 120 which serves to exchange a greater than normal amount of heat from the combustion gases with the dolomite, and then through a calcining region 122 which also serves to exchange greater than normal amounts of heat between the combustion gases and the dolomite load. In the calcining region the temperature of the dolomite is typically about 1600° F., and it is here that the carbon dioxide is driven off from the dolomite. The dolomite reaches its maximum temperature in stabilization region 124 where its temperature is typically 3300 to 4200° F. In the practice of the present invention, it is desirable that the dolomite be retained in the stabilization region for from 2 to 4 hours and the speed of rotation of the kiln may be adjusted accordingly. The firing of the burners 110 and 112 may be adjusted so that the flame extends through the stabilization region.

FIGURE 2 is a section through the calcining region and shows details of a heat exchanger. In the calcining region the kiln may be seen to be comprised of an outer shell 126 and refractory brick 128 which conforms to the diameter of the shell. The calcining region contains four internal refractory walls 130, 132, 134 and 136, supported by suitable refractory brick shapes 138, 140 and 142. The walls may be four inches thick in a typical industrial embodiment. The walls 130–136 serve to divide the kiln into four chambers so that the dolomite is tumbled four times as frequently in the calcining region as in passage through the undivided portion of the kiln. The extra lifting and tumbling of the dolomite load serves to expose it to the hot combustion gases more frequently and also serves to bring it into contact with hot walls 130–136 from which it picks up heat. Furthermore, the extra lifting and tumbling serve to bring hot particles of dolomite into contact with relatively cooler particles of dolomite, thereby serving to raise the average temperature of all the dolomite. The term "solid radiation" may be used to describe the effect.

The recuperator region is similar to the calcining region except that it is provided with metal walls 144, 146, 148, 150, 152 and 154 which divide it into six chambers. The metal walls may be three-quarters inch thick in a typical industrial embodiment. Metal may be used in the recuperator section because the load temperatures are much lower there than the calcining region, typically being about 800–1000° F.

The action and effect of the recuperator section is similar to that of the calcining region and serves to exchange a greater amount of heat from the hot combustion gases to the load.

Figure 4:
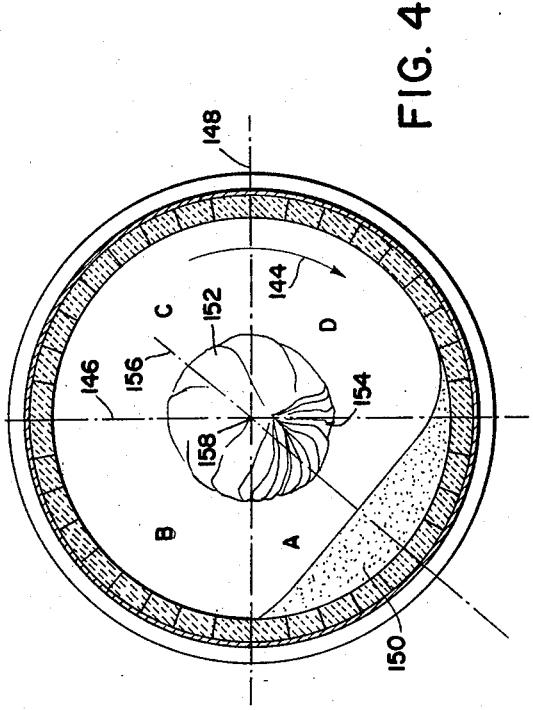
FIGURE 4 is a cross-sectional view taken generally along lines 4—4 of FIGURE 1 and showing the relationship of flame and load under operating conditions.

As may be seen in FIGURE 4, the stabilization region is defined within the kiln shell 126 and the refractory brick 128. The load, due to the rotation of the kiln in the direction of the arrow 144, lies off-center of the bottom of the kiln and substantially in a quadrant A as defined by vertical plane 146 and substantially horizontal plane 148 which run the length of the kiln. The load 150 forms an angle typically 35 to 45 degrees with the horizontal.

As may be seen in FIGURE 4, the flame 152 from the coal burner has a high temperature portion 154 which is adjacent the load. Ideally the high temperature flame portion 154 is centered about a plane 156 which is defined by the center of the load 150 and the axis of rotation 158 of the kiln. The high temperature flame lies substantially in quadrant A.

In a typical industrial embodiment the rotary kiln may be 10 feet inside diameter and 300 feet long, with the calcining region heat exchanger and the recupterator region heat exchanger, each being about 20 feet long.

While the present invention is described with regard to apparatus in which the major portion of the heat requirement is supplied by a coal-air burner, it is to be understood that burners utilizing other types of fuel may also be used, such as fuel oil, or manufactured or natural gas.

Some modifications to an existing kiln, hood and associated equipment may be desirable to practice the present invention with maximum efficiency. The rotary kiln is preferably provided with heat exchanger equipment in the feed end. A high temperature refractory combination with insulation is desirably used in the fire zone. A modified hood design and air-cooled kiln seal are advantageous to accommodate the higher temperature.

In order more clearly to disclose the nature of the present invention, specific examples of the practice of the invention are hereinafter given. It should be understood, however, that this is done solely by way of example and is intended neither to delineate the scope of the invention nor limit the ambit of the appended claims.

Example 1

The product of the present invention was made in a standard rotary kiln having an internal diameter of 10 feet and about 300 feet long. The major portion of the heat requirement was supplied by a coal-air burner, and a propane-oxygen burner was used to supply the balance of the heat requirement.

A product meeting the requirements of a high purity commercial dolomite refractory brick grain was made. The product was satisfactory in all respects. The objectives of the test were to operate at approximately 3450° F. and to limit the total heat input to the kiln so as to sustain a speed of 48–50 r.p.h. (revolutions per hour of the kiln).

As shown by the results in Table I, the total heat input was adjusted to maintain the product at a temperature between 3300–3400° F. The temperature maintained the product discharge temperature below 2800° F. and served to protect the brick in the kiln nose section.

It was found that kiln speeds in excess of 30 r.p.h. could be used while still maintaining the hydration susceptibility quality of the product when a gas-oxygen burner was used.

It was also found that when using the gas-oxygen burner the kiln operators were able to improve the burning qualities of the dolomite within a couple of hours. Previously, burning quality problems required from five to six hours to solve.

The brick grain feed was turned into the kiln and at 10:00 a.m. on the first day the gas-oxygen lance was started. Readings were taken at about hourly intervals and are reported in part in Table I. Initially the fuel gas and oxygen volumes were set at 8,000 and 12,000 c.f.h. (cubic feet per hour), respectively, as shown in Table I. An acceptable product was being made by 3:00 p.m. on the first day.

The burner angle "A" in Table I is the angle between the center line of the coal-air burner and the center line of the propane-oxygen burner. The angle was varied from time to time as shown in Table I. The discharge ends of the two burners were substantially coextensive.

The load temperature shown in Table I was measured at the end of the stabilization zone and was the hottest temperature reached by the load.

In order to produce a hotter flame the fuel gas and oxygen were increased to 10,000 and 15,000 c.f.h., respectively. At 2:15 p.m. instead of obtaining a hotter flame, a cooler flame resulted because of malfunctioning of an oxygen-gas analyzer. Because of the malfunction the kiln was slowed to 25 r.p.h. at 3:40 p.m. Effects of the cooler kiln are shown in the hydration susceptibility results for the 4, 5, and 6 p.m. samples. The oxygen-gas analyzer was put back in service at 7:00 p.m. and with the guidance of this instrument the heat input to the kiln was increased as was the speed of rotation from 32 to 40 r.p.h.

The oxygen rate was increased to 18,000 c.f.h. at 10:25 a.m. on the third day, and the kiln speed was increased from 30 to 47 r.p.h. by 3:00 p.m. It was found that the low hydration susceptibility of the brick grain was maintained during the rapid changes.

Examples 2–7

The procedure of Example 1 was repeated in a number of different runs. The results are recorded below in Table II.

Example 8

The procedure of Example 1 was repeated except that a propane-air burner was used to supply the balance of the heat requirement. The results are shown below in Table II.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention.

TABLE I

| Time | Kiln Speed, r.p.h. | Flame Temp., ° F. | Load Temp., ° F. | Feed lb./hr. | Discharge lb./hr. | Coal Flow lb./hr. | Gas Flow, c.f.h. | O₂ Flow, c.f.h. | Burner Angle "A" | Hydration Susceptibility, Percent |
|---|---|---|---|---|---|---|---|---|---|---|
| First Day: | | | | | | | | | | |
| 10:40 a.m. | 40 | 3,540 | 3,340 | 40,200 | 17,800 | 6,975 | 8,000 | 12,000 | 7° | |
| 11:00 a.m. | 55 | 3,530 | 3,360 | | | | 8,000 | 12,000 | | |
| 11:30 a.m. | 58 | 3,560 | 3,410 | | | | 8,000 | 12,000 | 5°30′ | |
| 11:50 a.m. | 58 | 3,480 | 3,410 | | | | 8,000 | 12,000 | | |
| 12:25 p.m. | 50 | 3,460 | 3,360 | | | | 8,000 | 12,000 | | |
| 1:00 p.m. | 42 | 3,460 | 3,340 | | | | 8,000 | 12,000 | 7° | |
| 2:00 p.m. | 42 | 3,440 | 3,360 | | | | 8,000 | 12,000 | | |
| 2:45 p.m. | 42 | 3,480 | 3,340 | | | | 10,000 | 15,000 | | |
| 3:30 p.m. | 40 | 3,440 | 3,130 | | | | 10,000 | 15,000 | 7°45′ | 2.55 |
| 4:05 p.m. | 25 | 3,500 | 3,180 | | | | 10,000 | 15,000 | | 8.68 |
| 4:35 p.m. | 25 | 3,530 | 3,240 | | | | 10,000 | 15,000 | | |
| 5:05 p.m. | 30 | 3,560 | 3,220 | | | | 10,000 | 15,000 | | 20.95 |
| 5:50 p.m. | 30 | 3,560 | 3,210 | | | | 10,000 | 15,000 | | 14.33 |
| 6:45 p.m. | 32 | 3,560 | 3,270 | | | | 10,000 | 15,000 | | 6.09 |
| 7:35 p.m. | 34 | 3,560 | 3,310 | | | | 10,000 | 15,000 | | |
| 8:00 p.m. | 36 | 3,560 | 3,300 | | | | 10,000 | 15,000 | | 3.86 |
| 8:50 p.m. | 36 | 3,560 | 3,310 | | | | 10,000 | 15,000 | | |
| 9:30 p.m. | 38 | 3,590 | 3,360 | | | | 10,000 | 15,000 | | |
| 10:00 p.m. | 38 | 3,600 | 3,350 | | | | 10,000 | 15,000 | | 1.35 |
| 11:00 p.m. | 40 | 3,600 | 3,360 | | | | 10,000 | 15,000 | | |
| 11:30 p.m. | 40 | 3,600 | 3,370 | | | | 10,000 | 15,000 | | |
| 12:00 p.m. | 38 | 3,570 | 3,230 | | | | 10,000 | 15,000 | | 0.75 |
| Second Day: | | | | | | | | | | |
| 1:00 a.m. | 38 | 3,650 | 3,260 | 44,400 | 18,900 | 6,520 | 10,000 | 15,000 | 7°45′ | |
| 2:00 a.m. | 38 | 3,670 | 3,350 | | | | 10,000 | 15,000 | | 0.75 |
| 2:50 a.m. | 38 | 3,640 | 3,350 | | | | 10,000 | 15,000 | | |
| 4:00 a.m. | 40 | 3,620 | 3,300 | | | | 10,000 | 15,000 | | 0.72 |

TABLE I—Continued

| Time | Kiln Speed, r.p.h. | Flame Temp., °F. | Load Temp., °F. | Feed lb./hr. | Discharge lb./hr. | Coal Flow lb./hr. | Gas Flow, c.f.h. | O₂ Flow, c.f.h. | Burner Angle "A" | Hydration Susceptibility, Percent |
|---|---|---|---|---|---|---|---|---|---|---|
| Second-Day—Continued | | | | | | | | | | |
| 5:00 a.m. | 40 | 3,650 | 3,320 | | | | 10,000 | 15,000 | | |
| 6:00 a.m. | 40 | 3,620 | 3,370 | | | | 10,000 | 15,000 | | 1.05 |
| 6:55 a.m. | 40 | 3,630 | 3,380 | | | | 10,000 | 15,000 | | |
| 7:40 a.m. | 40 | 3,660 | 3,400 | | | | 10,000 | 15,000 | | |
| 8:05 a.m. | 40 | 3,600 | 3,380 | | | | 10,000 | 15,000 | | 1.34 |
| 9:15 a.m. | 40 | 3,600 | 3,380 | | | | 10,000 | 15,000 | 8°30′ | |
| 10:00 a.m. | 42 | | 3,450 | | | | 10,000 | 15,000 | | |
| 11:00 a.m. | 42 | 3,670 | 3,440 | | | | 10,000 | 15,000 | | 3.94 |
| 12:00 m. | 40 | 3,630 | 3,450 | | | | 10,000 | 15,000 | | |
| 1:00 p.m. | 40 | 3,610 | 3,430 | | | | 10,000 | 15,000 | | 4.82 |
| 2:00 p.m. | 40 | 3,650 | 3,400 | | | | 10,000 | 15,000 | | 1.09 |
| 4:45 p.m. | 40 | 3,680 | 3,240 | | | | 10,000 | 15,000 | | 0.72 |
| 6:45 p.m. | 38 | 3,620 | 3,330 | | | | 10,000 | 15,000 | | 0.46 |
| 7:50 p.m. | 36 | 3,620 | 3,340 | | | | 10,000 | 15,000 | | |
| 9:00 p.m. | 36 | 3,690 | 3,370 | | | | 10,000 | 15,000 | | 0.99 |
| 10:00 p.m. | 38 | 3,660 | 3,300 | | | | 10,000 | 15,000 | | |
| 11:15 p.m. | 40 | 3,630 | 3,350 | | | | 10,000 | 15,000 | | 1.10 |
| Third Day: | | | | | | | | | | |
| 12:30 a.m. | 40 | 3,620 | 3,320 | 48,000 | 30,800 | 9,850 | 10,000 | 15,000 | 8°30′ | |
| 1:15 a.m. | 40 | 3,580 | 3,330 | | | | 10,000 | 15,000 | | 1.90 |
| 2:00 a.m. | 38 | 3,570 | 3,320 | | | | 10,000 | 15,000 | | |
| 3:00 a.m. | 40 | 3,560 | 3,380 | | | | 10,000 | 15,000 | | 3.34 |
| 4:00 a.m. | 40 | 3,590 | 3,380 | | | | 10,000 | 15,000 | | |
| 5:00 a.m. | 40 | 3,550 | 3,390 | | | | 10,000 | 15,000 | | 3.07 |
| 6:00 a.m. | 40 | 3,540 | 3,380 | | | | 10,000 | 15,000 | | |
| 7:00 a.m. | 38 | 3,540 | 3,380 | | | | 10,000 | 15,000 | | |
| 8:00 a.m. | 42 | 3,630 | 3,410 | | | | 10,000 | 15,000 | | 3.50 |
| 8:25 a.m. | 42 | 3,460 | 3,350 | | | | 10,000 | 15,000 | | |
| 9:05 a.m. | 42 | 3,580 | 3,360 | | | | 10,000 | 15,000 | | |
| 10:10 a.m. | 30 | 2,940 | 3,170 | | | | | | | 5.75 |
| 11:00 a.m. | 35 | 3,560 | 3,250 | | | | 10,000 | 18,000 | | |
| 11:30 a.m. | 38 | 3,560 | 3,310 | | | | 10,000 | 18,000 | | |
| 12:00 m. | 40 | 3,600 | 3,360 | | | | 10,000 | 18,000 | | 1.69 |
| 1:00 p.m. | 41 | 3,580 | 3,340 | | | | 10,000 | 18,000 | | |
| 1:50 p.m. | 43 | 3,600 | 3,370 | | | | 10,000 | 18,000 | | 1.90 |
| 2:25 p.m. | 45 | 3,590 | 3,330 | | | | 10,000 | 18,000 | | |
| 3:25 p.m. | 47 | 3,500 | 3,430 | | | | 10,000 | 18,000 | | |
| 4:00 p.m. | 47 | 3,500 | 3,410 | | | | 10,000 | 18,000 | | 1.70 |
| 5:00 p.m. | 42 | 3,520 | 3,350 | | | | 10,000 | 18,000 | | |
| 6:00 p.m. | 40 | 3,590 | 3,400 | | | | 10,000 | 18,000 | | 0.44 |
| 7:00 p.m. | 40 | 3,540 | 3,430 | | | | 10,000 | 18,000 | | |
| 8:00 p.m. | 40 | 3,580 | 3,340 | | | | 10,000 | 18,000 | | 0.48 |
| 9:00 p.m. | 43 | 3,510 | 3,340 | | | | 10,000 | 18,000 | | |

TABLE II.—BRICK GRAIN INFORMATION

| Example | Hydration Susceptibility, Percent | Specific Gravity | Closed Pore Volume, Percent | Amsler Bulk Density |
|---|---|---|---|---|
| 2 | 3.35 | 3.397 | 1.80 | 3.264 |
| 3 | 1.90 | 3.442 | 2.71 | 3.300 |
| 4 | 2.01 | 3.423 | 2.12 | 3.216 |
| 5 | 1.28 | 3.381 | 1.94 | 3.270 |
| 6 | 3.23 | 3.406 | 2.42 | 3.168 |
| 7 | 5.07 | 3.397 | 2.39 | 3.199 |
| 8 | 4.48 | | | |

What is claimed is:

1. A process for producing an improved dolomitic refractory having a hydration susceptibility of less than about 5.0%, a specific gravity greater than about 3.40 and a bulk density of at least about 3.20 comprising sizing the dolomite feed material to between 200 mesh and 1 inch; heating the dolomite in a rotary kiln to a temperature of at least 3300° F. for a predetermined period of time between about 2–4 hours, and then discharging said improved dolomitic refractory from said rotary kiln within a period of time less than about one-half said predetermined period of time.

2. A process for producing an improved dolomitic refractory having a hydration susceptibility of less than about 5.0%, a specific gravity greater than about 3.40 and a bulk density of at least about 3.20 comprised of sizing the dolomite feed between 200 mesh and 1 inch; tumbling the dolomite in a rotary kiln, burning a first fuel-air mixture to produce a long, luminous flame; burning a second fuel-air mixture, impinging the second fuel-air flame on the first fuel-air flame to increase the flame temperature in substantially only the quadrant adjacent the load, maintaining said tumbling dolomite adjacent said hot quadrant for sufficient time between about 2–4 hours to heat the dolomite to at least 3300° F., and then discharging said dolomite from said rotary kiln within a period of time less than about one-half the time said dolomite is maintained adjacent said hot quadrant.

3. A process according to claim 2 wherein the dolomite is sized to between ⅜ inch and 20 mesh.

4. A process according to claim 2 in which the dolomite is sized between 8 mesh and 1 inch.

5. A process according to claim 2 in which the dolomite is heated to a temperature between 3300 and 4200° F.

6. A process according to claim 2 in which the dolomite is heated to a temperature between 3500 and 3660° F.

7. A process according to claim 2 in which the dolomite is heated to a temperature of about 3660° F.

8. A process for producing an improved dolomitic refractory having a hydration susceptibility of less than about 5.0%, a specific gravity greater than about 3.40 and a bulk density of at least about 3.20 comprised of sizing the dolomite feed between 200 mesh and 1 inch; tumbling the dolomite in a rotary kiln, burning a fuel-air mixture to produce a long, luminous flame; burning a fuel-oxygen mixture, impinging the fuel-oxygen flame on the fuel-air flame to increase the flame temperature in substantially only the quadrant adjacent the load, maintaining said tumbling dolomite adjacent said hot quadrant for sufficient time between about 2–4 hours to heat the dolomite to at least 3300° F., and then discharging said dolomite from said rotary kiln within a period of time less than about one-half the time said dolomite is maintained adjacent said hot quadrant.

References Cited

UNITED STATES PATENTS

| 3,070,449 | 12/1962 | Davies et al. | 106—58 |
| 3,271,172 | 9/1966 | Powers et al. | 106—63 |
| 3,276,882 | 10/1966 | Buntenbach et al. | 106—58 |
| 3,280,228 | 10/1966 | Pack et al. | 106—58 |
| 3,304,188 | 2/1967 | Hughey | 106—58 |

JAMES E. POER, *Primary Examiner.*